United States Patent [19]

Grasso et al.

[11] Patent Number: 5,138,483
[45] Date of Patent: Aug. 11, 1992

[54] LOW-NOISE ACTIVE FIBER OPTICAL AMPLIFIER WITH PUMPING POWER REFLECTOR

[75] Inventors: Giorgio Grasso, Monza; Aldo Righetti, Milan; Flavio Fontana, Cormano, all of Italy

[73] Assignee: Societa' Cavi Pirelli S.p.A., Milan, Italy

[21] Appl. No.: 824,742

[22] Filed: Jan. 21, 1992

Related U.S. Application Data

[63] Continuation of Ser. No. 604,120, Oct. 26, 1990, abandoned.

[30] Foreign Application Priority Data

Oct. 30, 1989 [IT] Italy .................. 22196 A/89

[51] Int. Cl.$^5$ .......................... H01S 3/30; G02B 6/26
[52] U.S. Cl. ........................ 359/341; 359/307; 372/6; 372/71
[58] Field of Search ............ 359/337; 372/70, 71

[56] References Cited

U.S. PATENT DOCUMENTS

| | | | |
|---|---|---|---|
| 4,589,016 | 8/1989 | Shaw et al. | 350/96.15 |
| 4,637,025 | 1/1987 | Snitzer et al. | 372/1 |
| 4,674,830 | 6/1987 | Shaw et al. | 330/4.3 |
| 4,681,396 | 7/1987 | Jones | 372/71 |
| 4,712,075 | 12/1987 | Snitzer | 359/337 |
| 4,839,898 | 6/1989 | Payne et al. | 350/96.15 |
| 4,910,737 | 3/1990 | Payne et al. | 350/96.5 |
| 4,938,556 | 7/1990 | Digonnet et al. | 350/96.15 |
| 4,963,832 | 10/1990 | Desurvine et al. | 330/4.3 |
| 4,964,131 | 10/1990 | Liu et al. | 350/96.15 |
| 5,048,026 | 9/1991 | Shaw et al. | 359/341 |

OTHER PUBLICATIONS

Morhel, P. R.; "All-Fibre, Diode-Pumped Recirculating-Ring Delay Line"; Elect. Att., vol. 24, #10, May 12, 1988, pp. 608-609, (GB).

*Primary Examiner*—Nelson Moskowitz
*Attorney, Agent, or Firm*—Brooks Haidt Haffner & Delahunty

[57] ABSTRACT

An optical, low-noise amplifier of the active-fiber type, which fiber contains a laser light emitting substance, adapted to be connected to an optical telecommunication fiber and receiving light therefrom at the transmission wavelength. The active fiber is also fed from a light source at a pumping wavelength and has a length corresponding to a partial absorption of the pumping light. Downstream of active fiber, there is a selective mirror device which reflects the light at the pumping wavelength and is transparent to the transmission wavelength light. Preferably, the mirror device consists of an optical demultiplexer adapted to separate the transmission wavelength and the pumping wavelength on two output fibers. A mirror which reflects the pumping wavelength is present at the end of the fiber carrying the pumping wavelength.

10 Claims, 2 Drawing Sheets

LOW-NOISE ACTIVE FIBER OPTICAL AMPLIFIER WITH PUMPING POWER REFLECTOR

This application is a continuation of application Ser. No. 07/604,120, filed Oct. 26, 1990, now abandoned.

FIELD OF THE INVENTION

The present invention relates to an optical amplifier for optical fiber telecommunication lines, and more particularly, to an optical preamplifier having high gain efficiency with respect to the input pumping power and a low-noise figure.

BACKGROUND OF THE INVENTION

In the field of telecommunication lines, optical fibers have been relatively recently introduced, and a modulated light signal is input to the lines. Such optical systems are particularly convenient since optical fibers can transmit a signal over long distances with very reduced attenuations.

In order to further increase the signal transmission distance, optical amplifiers are already known which are provided with a portion of the so-called "active" fiber into which light "pumping" energy of a lower wavelength than the signal energy is fed. Such pumping energy causes, inside the active fiber, a transition to the state of laser light emission of the dopants present therein. The presence of a signal having a wavelength corresponding to said laser light emission state gives rise to a decay of the dopant atoms from the laser state to a base state, which is associated with a light emission consistent with the signal thereby causing the amplification thereof.

Said optical amplifiers allow a signal amplification to be achieved in the fiber without resorting to electronic apparatus which needs the transformation of the signal from an optical signal to electrical signal, then electrically amplified and again converted to an optical signal thereby introducing into the telecommunication line all the limitations inherent in the electronic apparatus used and in particular, restricting the transmission frequency.

For their operation, optical amplifiers need a source of pumping light of a particular wavelength, lower than the transmission wavelength, which is introduced into the fiber carrying the transmission signal through a dichroic coupler or optical multiplexer and which diffuses within the active fiber with an increasing attenuation of its light power in the fiber length, mainly due to the transfer of energy to the dopants excited in the laser light emission state.

Therefore, the light pumping power, responsible for the amplifier gain, gradually decreases within the active fiber, so that the exploitation of the active fiber properties becomes increasingly lower over the length thereof.

The minimum light power which is required for each portion of the active fiber, so that an amplification gain can be obtained, is designed as the threshold power, above which a population inversion takes place, that is, there is a higher number of atoms in the excited laser light emission state than in the base state and, therefore, the signal photons can cause a transition from the laser light emission state to the light emission base state thereby giving rise to a gain.

On the other hand, when the light power is lower than the threshold power, the atomic population is higher in the base state and the signal photons are very likely to cause, by themselves, a transition to the excited state, so that a signal attenuation occurs instead of a gain.

Since there is also the possibility of spontaneous decays from the excited state to the base state with a light emission independent of the signal, defined as "noise", in the presence of low gains, that is, with a pumping power slightly higher than the threshold power, there is a low signal-to-noise ratio which impairs the transmission quality. In fact, when the pumping power values are near the threshold values, that is, in a condition of reduced population inversion, a great number of atoms are subjected to spontaneous decay with respect to those in which a stimulated transition giving origin to a gain occurs. As a result, therefore, there is a worsening in the signal-to-noise ratio.

Because of this phenomenon, the active fiber is selected to have a length significantly lower than the length at which the pumping power reaches the level of the threshold power at its end portion.

However, as a result, part of the pumping power is unused so that the amplifier efficiency is restricted, and in addition, since this power diffuses in the transmission fiber downstream of the amplifier, it can give rise to disadvantages, in particular, when the amplifier is a preamplifier at the end of a transmission line and is connected to receiving electronic apparatus.

Therefore, it is desirable to provide an optical amplifier having a reduced "noise figure", that is, having the maximum output signal-to-noise ratio and capable of eliminating the unused pumping power at the amplifier output.

BRIEF DESCRIPTION OF THE INVENTION

The present invention has, as one object, the providing of an active-fiber optical amplifier of the above described type, exhibiting high efficiency with respect to the pumping power and capable of achieving the maximum exploitation of the active fiber while keeping the pumping power value substantially constant over the whole length thereof and at the same time avoiding the propagation of the pumping light beyond the active fiber itself.

In accordance with the present invention, an optical amplifier of the active-fiber type adapted to be connected to an optical fiber in an optical telecommunication system comprises a portion of active optical fiber containing a laser-light emitting substance, which can connect to the telecommunication optical fiber and which receives light therefrom at the transmission wavelength, is also fed from a light source at a pumping wavelength lower than the transmission wavelength, which pumping light can be absorbed in the active fiber. The active fiber has a length corresponding to a partial absorption of the pumping light and at the downstream end of the active fiber, there is a selective mirror element which reflects the light at the pumping wavelength and is transparent to the light at the transmission wavelength.

The mirror element has a reflectivity into the active fiber lower than $-40$ db at the transmission wavelength and higher than $-10$ db at the pumping wavelength.

According to one embodiment of the invention, the mirror element comprises discrete components comprising a dichroic mirror and two focusing groups respectively adapted to send light from the active fiber to the dichroic mirror and from the dichroic mirror to the telecommunication optical fiber.

Alternatively, the mirror element comprises one or more monolithic optical fiber elements.

In a preferred embodiment, the mirror element comprises an optical demultiplexer having an input fiber connected to the end of the active fiber and adapted to receive the transmission wavelength and the pumping wavelength multiplexed in a single fiber and two output fibers, the demultiplexer being adapted to separate the transmission wavelength on one of the output fibers and the pumping wavelength on the other output fiber, the output fiber carrying the transmission wavelength being connected to the communication fiber and the output fiber carrying the pumping wavelength being provided, at the end thereof, with a mirror adapted to reflect the pumping wavelength.

Conveniently, in this latter embodiment, the mirror is a dichroic mirror having a reflectivity lower than −20 db at the signal wavelength and a reflectivity higher than −5 db at the pumping wavelength, and the demultiplexer provides a separation higher than −10 db between the transmission and pumping wavelengths.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF EMBODIMENTS OF THE INVENTION

Figure 1:
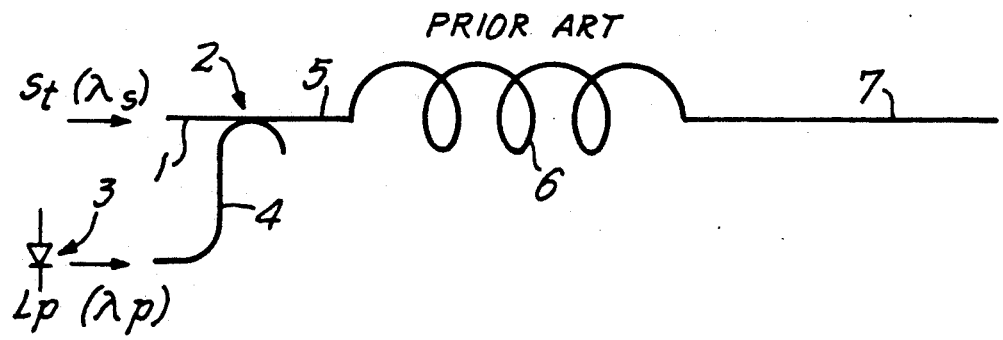
FIG. 1 is a schematic diagram of an optical amplifier according to the prior art.

The structure of a known optical amplifier of the active-fiber type is diagrammatically shown in FIG. 1 in which the reference numeral 1 designates a telecommunication optical fiber, to which a transmission signal $S_t$ of a wavelength $\lambda_s$ is applied. As said signal attenuates after a certain length of fiber 1 and for the purpose of being amplified, it is sent to the input of a dichroic coupler 2, or optical multiplexer, of a type known per se, where it is joined with the pumping light $L_p$ of wavelength $\lambda_p$ generated by a pumping laser light emitter 3 which is connected to the input of the coupler 2 by a fiber 4. The two wavelengths joined in the same fiber 5 exiting from the dichroic coupler 2 are supplied to the input of an active fiber 6.

In the active fiber 6, in the presence of the light pumping power, a light emission occurs which is stimulated at the $\lambda_s$ wavelength thereby amplifying the transmission signal $S_t$ delivered thereto. The transmission signal is then introduced into a transmission fiber 7, and it is then transmitted to its destination which can be either another portion of optical cable, another amplifier or a terminal receiving apparatus.

When the fiber 7 is connected to another portion of an optical cable or to another amplifier, the amplifier is called a "line" amplifier, whereas when the fiber 7 is connected to terminal apparatus, the assembly is called "preamplifier", that is, a device adapted to raise the magnitude of the optical signal at the end of a transmission line before its conversion to an electrical signal.

Figure 2:
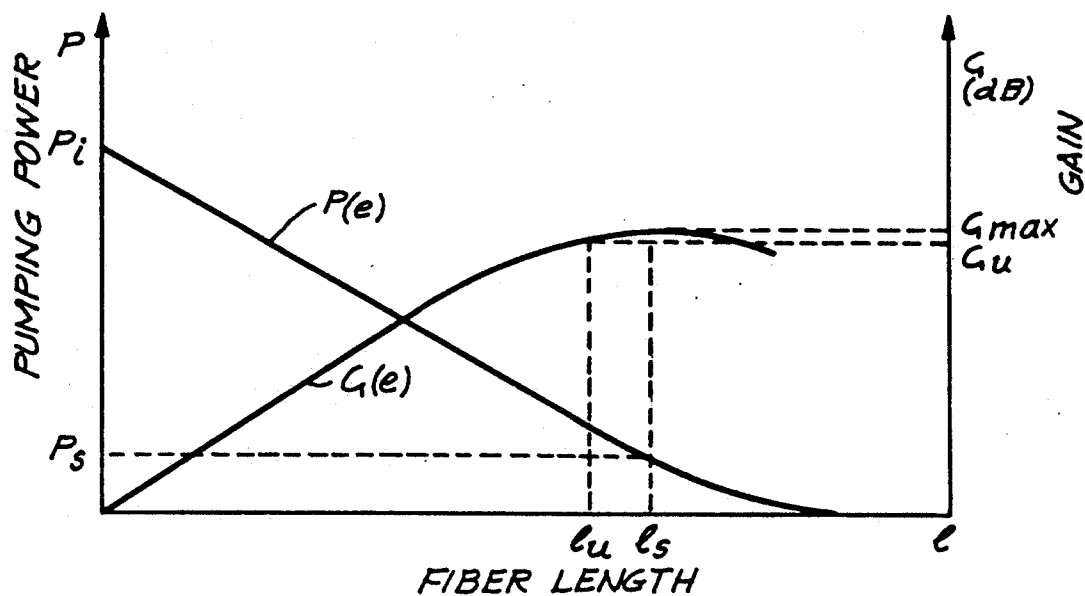
FIG. 2 is a graph showing the variation of the pumping power and of the corresponding amplification gain in the active fiber length of the amplifier illustrated in FIG. 1.

As shown in FIG. 2, the light pumping power "P" within the active fiber 6 decreases as the length of fiber 6 increases and has a substantially linear development starting from the input value $P_i$ because it is absorbed by the fiber so that dopants contained therein are brought to the laser light emission state.

After passing a portion $l_s$ of active fiber 6, the pumping power at the inside thereof reaches the saturation power value $P_s$, at which value the energy distribution within the fiber is such that it does not cause a transmission signal amplification, that is, a gain, and instead, causes an attenuation of said signal due to the transition to an excited state of the active substances of the fiber, to the detriment of the signal light energy itself.

The qualitative development of the gain G depending upon the length of the active fiber is shown in FIG. 2. As can be seen from the diagram of FIG. 2, for fiber lengths close to the saturation length $ll_s$ the gain exhibits a very small increase, up to the value $G_{max}$, whereas for fiber lengths longer than $l_s$ a gain decrease occurs.

For practical purposes, therefore, a fiber length $l_u$ lower than $l_s$ is used in order to have a sufficient gain $G_u$ for the signal with the introduction of the minimum of noise caused by spontaneous transitions from the laser light emission state to the base state.

In fact, noise is proportional to the atomic population present in the upper laser level and decreases less quickly than the gain along the fiber as the pumping power decreases in the fiber itself.

As shown in the diagram in FIG. 2, in an active fiber, the maximum pumping power $P_i$ determining the maximum achievable gain per fiber length unit takes place only in the initial length of the fiber itself, whereas subsequently, the pumping power becomes significantly lower which brings about a reduced exploitation of the available active fiber length for amplification purposes, as emphasized by the gain diagram shown in FIG. 2.

In the case of a preamplifier, that is, an amplifier located at the end of an optical line immediately upstream of a receiving and optical-to-electrical signal transforming device, it is possible to achieve an increase in the reception responsiveness when the noise of the preamplifier is lower than the noise of the receiving apparatus.

Since the amplifier noise is proportional to its gain, there is gain value for which the two noise contributions are the same. Such gain value is the maximum gain value to be used in a preamplifier for the purpose of improving the responsiveness on reception.

Adopting higher preamplification gains, on the other hand, can be convenient for different reasons, for example, in order to use less expensive apparatus downstream of the preamplifier without adversely affecting the signal receiving responsiveness.

Therefore, when optical amplifiers are employed as preamplifiers, the fiber length which is used is capable of supplying a pumping power P at the fiber end which gives rise to an overall gain of the same level as the increase of responsiveness.

Figure 3:
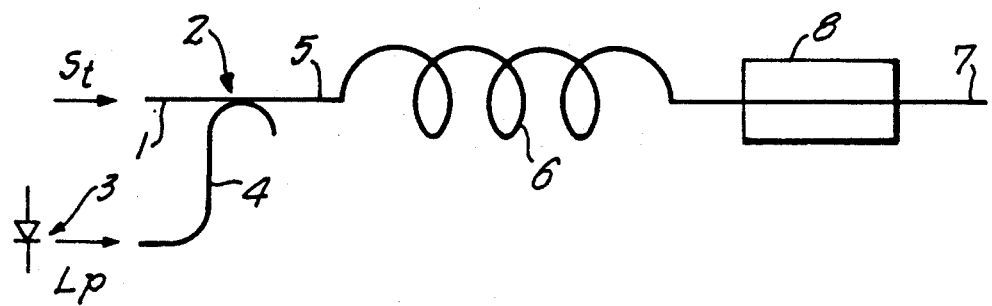
FIG. 3 is a schematic diagram of an optical amplifier in accordance with the invention and which comprises a reflecting unit.

In accordance with the present invention, as shown in FIG. 3, in an amplification unit comprising a dichroic coupler 2, a pumping laser 3 and an active fiber 6, a selective (or dichroic) mirror element 8 is provided downstream of the active fiber 6 which reflects the pumping wavelength $\lambda_p$ and permits the transmission wavelength $\lambda_s$ to pass unaltered.

Connected to the output of the mirror element 8 is the transmission fiber 7 carrying the amplified signal for transmitting it to its destination.

Figure 5:
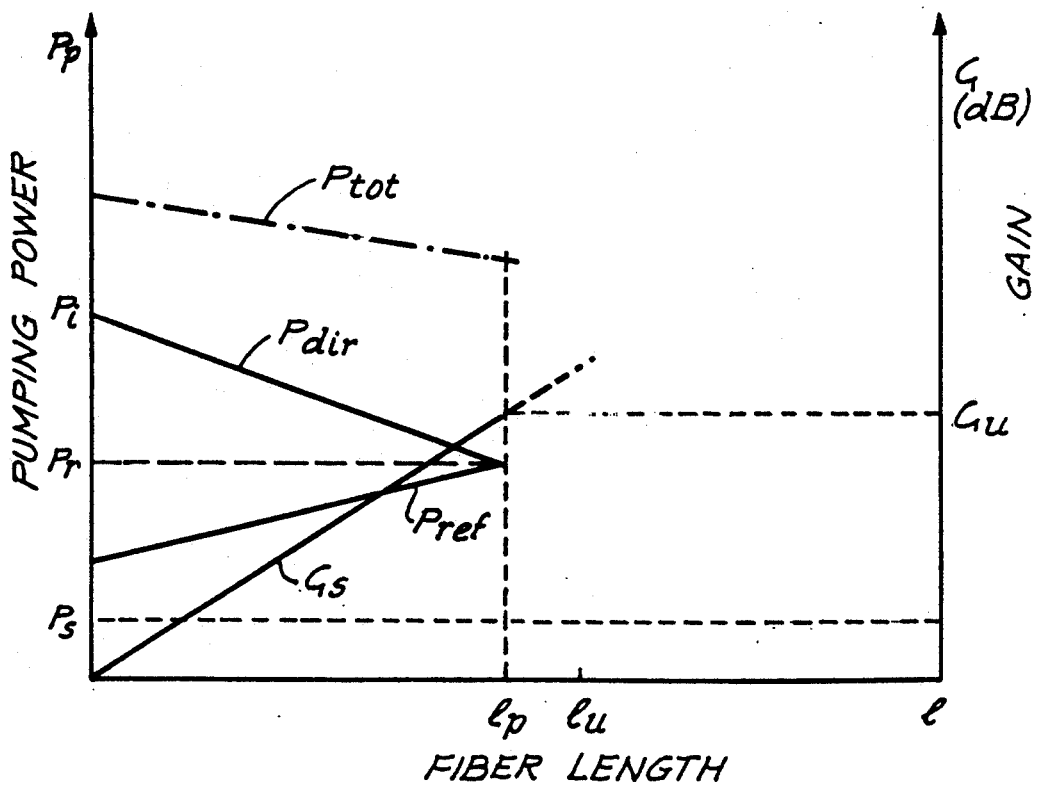
FIG. 5 is a graph showing the variation of the pumping power and of the corresponding amplification gain in the active fiber length of the amplifier illustrated in FIG. 3.

The mirror element 8, as shown in the diagram of FIG. 5, reflects the residual pumping power $P_r$ present at the end of a portion $l_p$ of the active fiber 6 backwards within the active fiber, so that the reflected power, $P_{ref}$, is added to the pumping power, $P_{dir}$, directly emitted from laser 3, thus giving a value of the pumping power, $P_{tot}$, in the active fiber 6 which is high and is almost constant, or decreasing with a small slope over the whole length of the active fiber used, as shown in dash-dot line $P_{tot}$ in FIG. 5.

It is therefore possible to keep a high population inversion value in the whole fiber which produces an improved gain even though the noise generated by the amplifier remains the same.

The mirror element 8 can be made by "microoptical" techniques using a selective mirror formed with a suitably treated plate reflecting only the pumping wavelength and equipped with lens-focusing members, or the like, adapted to convey the light from the optical fiber to the mirror and from the mirror back to the optical fiber 6 upstream of the mirror at the reflected wavelength and to the transmission fiber 7 downstream of the mirror at the wavelength to be passed. Alternatively, it is possible to make the mirror element in a monolithic form, using the same transmission optical fiber or several optical fibers, which brings about advantages from the point of view of the assembly stability.

Figure 4:
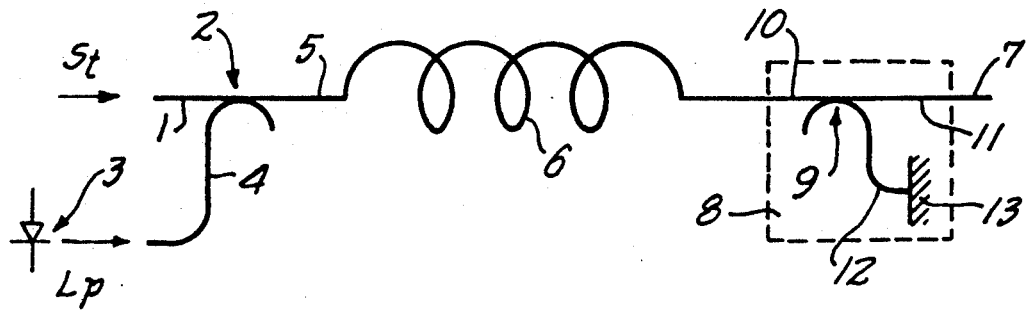
FIG. 4 is a schematic diagram of a specific embodiment of the amplifier illustrated in FIG. 3.

According to one convenient embodiment of the invention, shown in FIG. 4, the mirror element 8 consists of a second dichroic coupler 9, or optical demultiplexer, having an input fiber 10 and two output fibers 11, 12, in which transmission wavelength $\lambda_s$ and pumping wavelength $\lambda_p$ are respectively separated.

The transmission optical fiber 7 is connected to the output fiber 11 downstream of the coupler 9 whereas a mirror 13 is disposed at the end of the fiber 12.

As is known in the art, by the term "demultiplexer" is meant an optical element adapted to receive light having two different wavelengths in a single input fiber and to emit the same wavelengths separated by two outgoing fibers.

An actual optical demultiplexer or decoupling device, in the same manner as a multiplexer or dichroic coupler, provides a certain degree of separation between the output wavelengths, that is, a small fraction of the transmission signal $S_t$ can be found on the demultiplexer fiber 12. Such a signal, once it has been reflected by the mirror 13, could be undesirable in the transmission line 7 and in the optical fiber 6 because it would be amplified as well and could give rise to interference phenomena with the transmission signal $S_t$.

Therefore, should the demultiplexer provide a low amount of separation between the wavelengths, that is, lower than 20 db, a dichroic-type mirror 13, that is, a mirror having a reduced reflectivity at the transmission wavelengths, lower than −20 db, would be used so that in the mirror element 8 formed in this embodiment with the demultiplexer 9 and the dichroic mirror 13, there will be an overall separation between wavelengths at least greater than 40 db, at the wavelength $\lambda_s$.

It is to be noted that the light at the wavelength $\lambda_s$ passes twice through the demultiplexer, i.e., before and after the reflection. Therefore, the demultiplexer isolation acts twice in restricting the light power of wavelength $\lambda_s$ reflected by the mirror 13 and delivered into the fiber 6 and consequently, into the transmission line.

Should the demultiplexer provide a separation or isolation value higher than 20 db, such a demultiplexer will be sufficient to ensure the absence of reflection interference with the transmission wavelength in the line and, therefore, mirror 13 can be reflective at all the wavelengths employed.

Conveniently, the mirror 13 can be obtained by plating the end of fiber 12, cut by cleavage, or according to other known techniques adapted to create a reflective surface or area at the end of fiber 12 having the stated properties.

The structure of the embodiment shown in FIG. 4 is particularly convenient both because it is completely made of optical fibers, and therefore, it is strong and unresponsive, in the course of time, to vibrations or deformations to which miniaturized focusing apparatus and the like could be subjected and because the combination of the separation characteristics belonging to the demultiplexer and of the selective reflectivity belonging to the dichroic mirror offers a great freedom during the planning step during which one wants to achieve the most appropriate result for the specific application. In particular, the embodiment provides the maximum reflection at the pumping wavelength whereas the reflection is minimum at the transmission wavelength.

A specific amplification unit in accordance with the invention has been constructed in accordance with the diagram shown in FIG. 4, and a second amplification unit without the reflecting member 13 and hence, according to the diagram of FIG. 1 has been constructed for comparison.

In both embodiments, a transmission line having a signal $S_t$ of 1536 nm wavelength and a pumping laser diode 3 of 10 mW-power and 980 nm wavelength were used.

A 980-to-1536-nm optical multiplexer or coupler 2 was used with 90% coupling at 980 nm and 15 db isolation.

In both tests, a step index-type Si/Ge active fiber 6 doped with $Er^{3+}$ ions was used.

In the amplification unit in accordance with the diagram of FIG. 1 a 9 m length of active fiber 6 was used, whereas in the amplification unit in accordance with the diagram of FIG. 4 the active fiber had a length of 7 m.

In the amplifier of FIG. 4, the 980-to-1536 nm demultiplexer 9 had a 90% coupling at 980 nm and a 90% coupling at 1536 nm. There was a 30 db separation on both the outgoing branches.

The mirror was obtained by plating of the end of the demultiplexer fiber 12 with gold.

The configuration shown in FIG. 1 with a 9 m length of active fiber gave a 20 db gain $G_1$, with a noise figure defined as $(S/N)_i/(S/N)_o = 5$ db.

The configuration shown in FIG. 4 with a 7 m length of active fiber gave a 20 db gain $G_2$, which is a gain identical to the gain of the FIG. 1 embodiment, with a noise figure defined as $(S/N)_o = 3$ db, which means a reduction of 2 db in the noise figure.

Consequently, an important improvement has been reached in the quality of the transmitted signal, by virtue of the lower noise introduced into the transmission line 7 from the amplifier in accordance with the invention.

In addition, the presence of the demultiplexer 9 causes the pumping wavelength to be eliminated from the line 7, which avoids a need for the use of filters or similar devices.

By virtue of the amplifier of the invention, it is possible to achieve an improved responsiveness in the receiving apparatus without a need for an increase in the pumping power for the purpose. An increase in pumping power would involve the use of stronger laser diodes or of two coupled diodes, the former not always being available and being expensive and the latter being highly subject to damage and failure.

In general, with the amplifier of the invention, depending upon the particular requirements of each specific application, it is possible either to improve the noise figure in the transmission with the same power, to reach a higher gain, the applied pumping power being the same or, without changing the achieved gain, to use a pumping light source having a lower power.

While the invention has been described in connection with optical preamplifiers, it will be apparent to those skilled in the art that the principles of the invention are not limited to preamplifiers. The principles can also be applied to line amplifiers and similar apparatus in which it is desired to reach a high pumping power level over the whole length of the optical fiber used.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical amplifier of the active fiber type for amplifying optical communication signals having a predetermined wavelength, said amplifier comprising:
    an optical coupler having a first input for receiving said communication signals at the wavelength of said communication signals, a second input for receiving pumping light energy and an output for transmitting both said communication signals and said pumping light energy;
    an active optical fiber which is long relative to its cross section and having a core and a cladding therearound, whereby said communication signals and said pumping light energy are guided along said core, said core being connected at one end thereof to said output for receiving both said communication signals and said pumping light energy and containing Erbium ions as laser light emitting dopant, which, when subjected to said pumping light energy and to said communication signals, emits light at said predetermined wavelength, said active optical fiber also having another end remote from said one end thereof from which light at said predetermined wavelength is emitted;
    a pumping light source having a wavelength lower than said predetermined communication signal wavelength, coupled to said second input of said optical coupler for supplying pumping light energy into said active fiber at said one end thereof, whereby said pumping light energy travels in said core in the direction of the longitudinal axis of said core and said Erbium ions are excited by said pumping light energy to a laser emitting state, from which state they decay to the ground state when subjected to said communication signals to cause amplified light emission from said other end of said active fiber at said predetermined wavelength of said communication signals, the light from said pumping light energy source being absorbed in said active fiber in an amount depending on the distance travelled in said active fiber from said one end of the latter toward said other end of the latter and said active fiber having a length between said one end and said other end such that said light from said pumping source is only partially absorbed in said active optical fiber;
    and a selective mirror element coupled to said other end of said active optical fiber, said mirror element reflecting light at said pumping wavelength into said other end of said active fiber and permitting light at said wavelength of said communication signals to pass therethrough; and
    said length between said one end of said active fiber and said other end of said active fiber being selected so that the pumping light energy at all points along the length of said fiber is greater than the pumping light energy in the absence of said selective mirror element; and is greater than the saturation power at all points along the length of said fiber.

2. An optical amplifier as set forth in claim 1 wherein said mirror element has a reflectivity at said communication wavelength less than −40 db and a reflectivity at the wavelength of said pumping source at least equal to −10 db.

3. An optical amplifier as set forth in claim 1 wherein said mirror element comprises a dichroic mirror.

4. An optical amplifier as set forth in claim 1 wherein said mirror element comprises a further optical fiber coupled at one end to said other end of said active optical fiber and a reflecting mirror connected to the other end of said further optical fiber.

5. An optical amplifier as set forth in claim 4 wherein said mirror element comprises an input fiber connected to said other end of said active optical fiber and an output fiber connected to the last-mentioned input fiber, and wherein said further optical fiber is coupled to the last-mentioned said input fiber.

6. An optical amplifier as set forth in claim 5 wherein said reflecting mirror is a dichroic mirror having a reflectivity less than −20 db at said communication signal wavelength and a reflectivity higher than −5 db at said wavelength of said pumping light source.

7. An optical amplifier as set forth in claim 1 wherein said selective mirror element is a demultiplexer which provides a discrimination between said communicaton signal wavelength and said wavelength of said pumping light source of at least −10 db.

8. An optical amplifier as set forth in claim 1 wherein said communication signals have a wavelength of substantially equal to 1536 nm and said pumping light source has a wavelength substantially equal to 980 nm.

9. An optical amplifier as set forth in claim 1 wherein said length between said one end of said core and said other end of said core is such that the pumping power at said other end of said core is greater than the threshold power of said active optical fiber.

10. An optical amplifier as set forth in claim 1 wherein said length between said one end of said core and said other end of said core is such that, in the absence of such mirror element, the pumping power at said other end of said core is less than said saturation power.

* * * * *